United States Patent [19]

Hudson et al.

[11] 3,929,698

[45] Dec. 30, 1975

[54] POLYMERIZABLE POLYMER COMPOSITIONS

[75] Inventors: Alan George Hudson, Maidstone; John Leonard Orpwood, West Kingsdown, both of England

[73] Assignee: Coates Brothers & Company Limited, London, England

[22] Filed: Feb. 24, 1975

[21] Appl. No.: 552,542

Related U.S. Application Data

[63] Continuation-in-part of Ser. No. 417,812, Nov. 21, 1973, abandoned.

[30] Foreign Application Priority Data

Dec. 1, 1972 United Kingdom............... 55598/72

[52] U.S. Cl.... 260/22 CB; 117/132 BF; 117/161 K; 117/161 LN; 260/21; 260/28.5 R; 260/850
[51] Int. Cl.².... C09D 3/52; C09D 3/66; C09D 5/25
[58] Field of Search .................. 260/21, 22 CB, 850

[56] References Cited
UNITED STATES PATENTS

| | | | |
|---|---|---|---|
| 2,919,254 | 12/1959 | Christenson et al............ | 260/22 CB |
| 2,940,945 | 6/1960 | Christenson et al................. | 260/21 |
| 3,163,615 | 12/1964 | Sekmakas...................... | 260/22 CB |
| 3,257,475 | 6/1966 | Sekmakas ........................... | 260/850 |
| 3,278,638 | 10/1966 | Sekmakas ........................... | 260/850 |
| 3,300,439 | 1/1967 | Chloupek et al. ................... | 260/850 |

FOREIGN PATENTS OR APPLICATIONS 1,336,468  11/1973  United Kingdom............ 260/23 AR

*Primary Examiner*—Ronald W. Griffin
*Attorney, Agent, or Firm*—Marn & Jangarathis

[57] ABSTRACT

The invention provides a polymerizable polyester composition formed by the reaction of: (A) acrylamide or methacrylamide; (B) from 1.5 to 2 moles ($k$ moles) of formaldehyde per mole of acrylamide or methacrylamide; (C) from 0.95 to 1 mole ($x$ mole) of a hydroxyl group containing component comprising one or more hydroxyl group containing compounds containing one primary or secondary hydroxyl group per molecule; and (D) ($k$-$x$) hydroxy equivalents of a polyester component comprising one or more polyesters containing primary/or secondary hydroxyl groups or a mixture of said polyester or polyesters with one or more hydroxyl group-containing compounds containing from 1 to 4 primary and/or secondary hydroxyl groups per molecule.

5 Claims, No Drawings

POLYMERIZABLE POLYMER COMPOSITIONS

This application is a continuation-in-part of U.S. application Ser. No. 417,812 filed on Nov. 21, 1973, now abandoned.

This invention is concerned with improvements in and relating to polymerisable polymer compositions and the preparation and use thereof. More particularly, the invention is concerned with polymerisable compositions derived from polyesters and which may be used as one or the only ingredient of a polymerizable composition such as a surface coating composition, impregnant composition, laminant composition or adhesive composition.

It has now been found, in accordance with the present invention that polyester resin compositions which may be polymerized by exposure to ultra violet light or high energy radiation may be prepared by reacting together, in one or more stages and in the presence of a polymerization inhibitor, (A) acrylamide or methacrylamide; (B) from 1.5 to 2 moles ($k$ moles), per mole of acrylamide or methacrylamide of formaldehyde; (C) from 0.95 to 1 mole ($x$ mole) of an organic hydroxy-group containing component comprising one or more organic hydroxyl containing compounds containing one primary or secondary aliphatic hydroxyl group per molecule as sole chemical functional group and, preferably, containing at least one unsaturated such hydroxyl group-containing compound; and (D) ($k-x$) hydroxy equivalents of a polyester component comprising one or more polyesters containing primary and/or secondary hydroxyl groups or a mixture of said polyester or polyesters with one or more hydroxyl group-containing compounds containing from 1 to 4 primary and/or secondary hydroxyl groups per molecule.

It will be understood that when components C and D are mixtures the number of moles or hydroxyl equivalents of each employed will be calculated from the average molecular weight or hydroxy equivalent weight of the mixture.

The term primary or secondary aliphatic hydroxyl group is intended to refer to a group HO—$CH_2$—or HO—CH< in which the carbon atom does not form part of an aromatic ring.

The term chemical functional group is intended to refer to a chemically reactive group (i.e. a group capable of reacting with another chemically reactive group) such as a hydroxyl, carboxyl, epoxide or anhydride but is not intended to refer to carbon-carbon unsaturation.

The methylolation reaction is preferably carried out in the presence of a small amount of an acidic catalyst to promote etherification with the polyester. Typically 1% w/w of a 25% solution of acid butyl phosphate may be employed. In some cases the acidity of the reactants themselves may prove sufficient.

Reaction of the hydroxyl compounds with the formaldehyde and the unsaturated amide is suitably carried out so that the water of reaction is removed as it is formed, e.g. by azeotropic distillation, typically using a Dean and Stark type separator. The presence of a polymerisation inhibitor, such as hydroquinone, is necessary at this stage in order to prevent reaction at the double bonds of the composition. The completion of the reaction is indicated by the cessation of the evolution of water.

Any non-reactive solvent (e.g. toluene used in the azeotropic distillation) is removed, for example by vacuum distillation, conveniently on the cool down stage at the end of the reaction.

The methylolation and etherification reactions may be carried out sequentially but it is preferred to carry them out simultaneously since this has economic advantages with regard to plant utilisation. Thus in the combined process formaldehyde (preferably in the form of paraformaldehyde) is added to the polyester (solution) together with the unsaturated amide.

In the sequential process the components C and D are added to preformed methylol acrylamide or methylol methacrylamide (obtained by reaction of the amide with formaldehyde).

In practice the reaction may be carried out using a slight excess of formaldehyde in order to speed up the reaction and in general the cost of this excess lost is negligible.

A wide variety of components (C) and (D) may be used in the preparation of the composition of the invention.

The hydroxyl group-containing polyester of component (D) is prepared in known manner by reacting a stoichiometric excess of one or more appropriate polyhydric alcohols with one or more saturated or unsaturated polycarboxylic acids or anhydrides optionally in the presence of one or more saturated or unsaturated monocarboxylic acids. The polyester should have a hydroxyl value in the range from about 50 mgKOH/g. to about 200 mgKOH/g. corresponding to a hydroxyl equivalent from about 1120 to about 280. A preferred range of hydroxyl value is from about 100 mgKOH/g. to about 160 mgKOH/g corresponding to a hydroxyl equivalent from about 560 to about 350.

A wide variety of hydroxyl group-containing compounds may be used as a part of component (D) (together with the polyester)and may, for convenience, be divided into five classes; namely, monohydric compounds, dihydric compounds, trihydric compounds, tetrahydric compounds and mixtures of different compounds. The various classes are discussed below and it will be understood that the monohydric compounds are compounds also suitable for use as component (C).

Monohydric compounds (also including component (C) )

1a. the hydroxyalkyl esters of saturated or unsaturated monocarboxylic acids and the hydroxyalkyl esters of the general type ROOCR"COOR" where —OOCR"COO— is the residue of an aliphatic or alicyclic dicarboxylic acid, R' is an alkyl or alkenyl group and R'" is a hydroxyalkyl group (e.g. 4-hydroxy-butyl propionato and hydroxyethyl acrylate)

1b. Aliphatic monohydric primary or secondary alcohols of the general formula $C_mH_{2m+1}OH$ where $m$ is from about 4 to 12. Typical examples of suitable aliphatic monohydric alcohols are n-butanol, isobutanol, n-pentanol, n-octanol, 2-ethylhexanol, 3,5,5-trimethyl-hexan-1-ol and n-decanol.

1c. Cyclic alcohols such as cyclohexanol, the methyl cyclohexanole, the dimethyl cyclohexanols, benzyl alcohol and 2-phenyl ethanol.

1d. Aliphatic monounsaturated primary and secondary monohydric alcohols of the general formula $C_{m'}H_{2m'-1}OH$ where $m'$ is from 3 to about 18, such as allyl alcohol, methallyl alcohol, undec-10-en-1-ol and oleyl alcohol.

1e. Unsaturated fatty alcohols such as linoleyl alcohol and linolenyl alcohol.

1f. Monalkyl and monoalkenyl ethers of dihydric alcohols such as 2-ethoxy ethanol, 2-butoxy ethanol, 2-allyloxy propan-1-ol, 3-oxapentan-1-ol and 3-oxa-heptan-1-ol.

1g. Dialkyl and dialkenyl ethers of trihydric alcohols, and trialkyl and trialkenyl ethers of tetrahydric alcohols, such as trimethylol propane diallyl ether, pentaerythritol triallyl ether and pentaerythritol trioctyl ether.

1h. The diesters of trihydric alcohols and the triesters of tetrahydric alcohols with saturated or unsaturated aliphatic carboxylic acids, such as glycerol dicrotonate, trimethylolpropane dicaprylate and pentaerythritol trioleate.

1i. Alkyl and cycloalkyl esters of hydroxy acids such as 2-ethylhexyl glycollate, n-butyl lactate and cyclohexyl ricinoleate.

Dihydric compounds (component D only)

2a. Aliphatic and alicyclic saturated and unsaturated dihydric primary or secondary alcohols such as ethanediol, 1, 2-propane diol, 1,3-propane diol 1-3 butane diol, 2-butene-1, 4-diol and 2, 2-bis-(4-hydroxy cyclohexyl) propane.

2b. Polyalkylene glycols of the formula

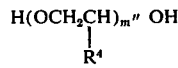

where $R^4$ is H or $CH_3$ and $m''$ is at least 2 and preferably not more than 4, such as diethylene glycol, triethylene glycol, dipropylene glycol and tripropylene glycol.

2c. 3-Thia-pentan-1, 5-diol

2d. Monoesters of trihydric alcohols with saturated or unsaturated aliphatic carboxylic acids; such as glyceryl-1monocaproate, glyceryl-1-monooleate, trimethylolpropane monocaprylate and trimenthylolethane monolinoleate.

2e. Monoalkyl and monoalkenyl ethers of trihydric alcohols such as glyceryl-1-allyl ether, trimethylol propane allyl ether, trimethylol ethane mono oleyl ether, glyceryl-1-hexyl ether and 1-methoxy butane-2,3-diol.

2f. Di-(hydroxy alkyl) esters of dicarboxylic acids such as di-(hydroxy propyl) itaconate, di-(hydroxyethyl) maleate and di-(hydroxybutyl) adipate. This class includes compunds of the structure:

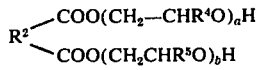

where $R^2$ is the hydrocarbon moiety of the dicarboxylic acid, $R^4$ and $R_5$ are H or $CH_3$ and $(a + b)$ lies in the approximate range 4–20. Such compounds are conveniently prepared by the reaction of the dicarboxylic acid with ethylene oxide and/or propylene oxide. A typical example is the reaction product of itaconic acid and propylene oxide in which $R^4$ and $R^5$ are $CH_3$,

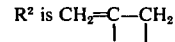

and $(a + b)$ is about 5.

2g. The dialkyl and dialkenyl ethers of tetrahydric alcohols, such as pentaeryth ritol diallyl ether.

2h. The diesters of tetrahydric alcohols with saturated or unsaturated aliphatic carboxylic acids, such as erythritol di-2 ethyl hexoate and pentaerythritol dilinoleate.

Trihydric compounds

3a. Aliphatic trihydric primary or secondary alcohols such as glycerol, the butane triols, the hexane triols and trimethylol propane.

3b. Monoesters of tetrahydric alcohols with saturated or unsaturated aliphatic carboxylic acids.

3c. Monoalkyl and monoalkenyl ethers of tetrahydric alcohols.

Tetrahydric compounds

4 Pentaerythritol

Mixtures

Mixtures of the hydroxyl group-containing compounds may be used for reasons of economy Typical mixtures used for reasons of economy are the fatty alcohols produced from the mixed acids occurring in natural oils and fat (e.g. the so-called palm kernel alcohols), the products of alcoholysis of soya bean oil with trimethylol propane, and the mixture of partial esters formed by the esterification of a polyhydric alcohol with less than the stoichiometric equivalent of a carboxylic acid or mixture of carboxylic acids.

As stated above, the polymerizable materials of the invention may be used as ingredients of polymerizable compositions such as varnishes, laminants, impregnants and adhesives, and preferably, form the sole or principal ingredient of such compositions. However, in order to give the compositions the optimum application properties, the materials of the invention may be used with the addition of monomers containing vinyl or vinylidene unsaturation for example the monomer material described in our copending application Ser. No. 322,938 filed Jan. 12, 1973 or with other unsaturated polymeric materials of known type. If it is desired to produce a coloured product, the composition may be pigmented with conventional additives to give paints or printing inks. The compositions comprising the polymerizable materials of the invention may be cured by thermal means or by irradiation with ultra violet or ionizing radiation. If the composition is intended for thermal cure, it should contain a free radical initiator such as a peroxide or, alternatively, the application conditions should be so arranged that the composition comes into contact with a free radical initiator before curing, for example by pre-treating the substrate with the free radical initiator. Where the compositions are intended for cure by ultra violet light, they should contain an ultra violet sensitizer. Where the compositions are intended for curing by meanns of ionizing radiation, such as an electron beam, no initiator or sensitizer is required.

In order that the invention may be well understood, the following Examples are given by way of illustration. In the Examples all parts and percentages are by weight unless otherwise stated. In Examples 1–11 the paraformaldehyde employed was "Low Polymer Formaldehyde (87%) Flake" manufactured by the Walker Chemical Company of Warrington, Lancashire, England.

Preparation 1

A typical polyester (polyester A) was prepared by reacting, in a conventional azeotropic process:

12.7 parts of glycerol
23.6 parts of phthalic anhydride
36.3 parts of castor oil The reaction temperature was 240°C. and the azeotropic solvent was xylene. The xylene was removed by vacuum distillation after the reaction was complete. The product had an acid value of 17.5 mgKOH/g. and a hydroxyl value of 154 mgKOH/g.

Preparation 2

A second typical polyester (polyester B) was prepared in a similar manner to that described in Preparation 1, at a temperature of 200°C., from:

20.5 parts of hydrogenated castor oil
18.2 Parts of phthalic anhydride
12.4 Parts of trimethylol ethane

Preparation 3

A third typical polyester was the commercial product Synolac 190X ("Synolac" is a registered trade mark), a glyceryl phthalate modified with the fatty acids of coconut oil and having an acid value of 6 mg KOH/g., a hydroxyl value of 157 mg KOH/g and a viscosity in 60% xylol solution of 28 stokes at 25°C. The commercially available xylene solution was subjected to vacuum distillation to remove substantially all the solvent before use to give polyester C.

EXAMPLE 1

500 Parts of polyester A were charged into a reaction vessel fitted with a Dean & Stark separator, stirrer and thermometer. Toluene (87 parts), hydroquinone (1 part) and trimethylol propane (44 parts) were added and the whole heated in a stream of nitrogen to 80°C. Hydroxyethyl acrylate (146 parts) was added, the temperature was returned to 80°C. and acrylamide (90 parts) added. The temperature was raised to 90°C and paraformaldehyde (160 parts) was added. The temperature was raised until brisk refluxing took place through the separator. The temperature had risen to 143°C. by the time reaction ceased as indicated by the cessation of water evolution. The product was allowed to cool under vacuum, during which period substantially all the toluene was distilled off. The final product was a viscous liquid to which was added 5% of a commercial photosensitiser, Trigonal 14 (Trigonal is a registered trade mark). Films of this solution applied to steel panels cured readily to hard coatings when exposed to U.V. radiation.

EXAMPLE 2

The procedure of Example 1 was followed using the following ingredients:

| Polyester A | 590 | parts |
| Toluene | 87 | parts |
| Hydroquinone | 0.5 | parts |
| Hydroxypropyl acrylate | 192 | parts |
| Acrylamide | 106 | parts |
| Paraformaldehyde | 106 | parts |

The viscous liquid product, mixed with 5% of Trigonal 14, was readily cured in thin films by U.V. radiation.

EXAMPLE 3

The procedure of Example 1 was followed, with similar results using the following ingredients:

| Polyester B | 186 | parts |
| Toluene | 87 | parts |
| Hydroquinone | 0.4 | parts |
| 3,4,5-Trimethyl hexanol | 144 | parts |
| Hydroxyethyl acrylate | 179 | parts |
| Acrylamide | 110 | parts |
| Paraformaldehyde | 110 | parts |

EXAMPLE 4

The procedure of Example 1 was followed, with similar results, using the following ingredients:

| Polyester C | 275 | parts |
| Toluene | 75 | parts |
| Hydroquinone | 0.4 | parts |
| 3,5,5-Trimethyl hexanol | 144 | parts |
| Hydroxyethyl acrylate | 182 | parts |
| Acrylamide | 111 | parts |

EXAMPLE 5 a. A polyester (polyester D) was prepared from

| Phthalic anhydride | 222 parts |
| Isophthalic acid | 247 parts |
| Cardura E | 490 parts |
| Pentaerythritol | 170 parts |

(Cardura E is the glycidyl ester of a branched chain synthetic aliphatic acid; "Cardura" is a registered trade mark.)

The reactants were heated in a stream of nitrogen with stirring at 240°C. until the acid value of the mixture had fallen to 20 mgKOH/g.

b. An unsaturated monohydric ester (ester A) was prepared by heating Cardura E (980 parts) to 135°C. in a stream of nitrogen and adding benzyldimethylamine (5 parts) and hydroquinone (2.8 parts) followed, slowly, by acrylic acid (328 parts) at such a rate that a temperature of 135°C was maintained. The reaction was continued until the acid value had fallen to 22 mgKOH/g. The product was a clear amber liquid of viscosity 1.95 stokes at 25°C.

c. Polyester D was used as component D and ester A as component C in the preparation of a product according to the invention using the following ingredients:

| Polyester D | 300 | parts |
| Hydroquinone | 0.35 | parts |
| Toluene | 87 | parts |
| Ester A | 245 | parts |
| Acrylamide | 71 | parts |
| Paraformaldehyde | 71 | parts |

The procedure followed that of Example 1 and the product was a very viscous liquid, to which were added 30% of trimethylolpropane triacrylate and 5% of Triganol 14 to yield a clear varnish which cured readily in thin films on exposure to U.V. radiation.

EXAMPLE 6

Polyester D was used as components D. and ester A as component C in the preparation of a product of the invention using the following ingredients:

| Polyester D | 150 | parts |
| --- | --- | --- |
| Toluene | 52 | parts |
| Hydroquinone | 0.3 | parts |
| Trimethylol propane | 23.5 | parts |
| Ester A | 252.5 | parts |
| Acrylamide | 73 | parts |
| Paraformaldehyde | 73 | parts |

The procedure followed that of Example 1. The product was a clear viscous liquid to which was added 5% of Trigonal 14 to yield a clear varnish which cured readily on exposure to U.V. radiation.

EXAMPLE 7

The modified polyester of Example 6 was made up into a lithographic ink by milling 15 parts of Rubine 2BS and two parts of a micronised polythene wax into 73 parts of the modified polyester of Example 6 using a triple roll mill. 10 parts by weight of Trigonal 14 were stirred in. The printed ink cured to a set-off free film on exposure to U.V. radiation in less than 1 second.

EXAMPLE 8

The modified polyester of Example 2 was made into a paint by milling 50 parts of rutile titanium dioxide into 60 parts of the modified polyester of Example 2 using a triple roll mill to a Hegmann gauge reading of 8 and then thinned with 40 parts of cyclohexl acrylate, added in portions with stirring, to yield a paint with a viscosity of 2.8 stokes.

The paint was applied to a phosphate pretreated steel panel by means of a bar coater and then subjected to a beam of electrons using an accelerator voltage of 125 kV and a beam current of 6.7 mA. The film was cured to a hard coating by a dose of 14 megarads.

EXAMPLE 9 a. A further typical polyester was the commercial product Synolac 88X, a glyceryl phthalate modified with the fatty acids of dehydrated castor oil and having an acid value of 29 mgKOH/g, a hydroxyl value of 111 mgKOH/g. and viscosity in 50% by weight xylol solution of 18 stokes at 25°C. The commercially available xylene solution was subjected to vacuum distillation to remove substantially all the xylene to give the polyester, polyester E.

b. Polyester E was used as component D in the preparation of a product of the invention, using the following ingredients;

| Polyester E | 252 | parts |
| --- | --- | --- |
| Toluene | 26 | parts |
| Hydroquinone | 0.3 | parts |
| Hydroxyethyl acrylate | 58.7 | parts |
| Acrylamide | 35.4 | parts |
| Paraformaldehyde | 35.4 | parts |

The procedure followed that of example 1. The product was thinned with cyclohexyl acrylate to give a 50% solution which was clear and had a viscosity of 3 stokes at 25°C. A film of the solution was applied to a phosphate treated steel panel with a bar applicator and then subjected to a beam of electrons using an accelerator voltage of 125 kV and a beam current of 6.7 mA. The film was cured to a hard coating by a dose of 14 megarads.

EXAMPLE 10 a. Preparation of a Substantially Monomeric Reactive Solvent

A reaction flask, equipped with a stirrer, nitrogen inlet, thermometer, a Dean & Stark separator communicating with a water cooled condenser and an electric heating mantle, was charged with 75 mls of toluene, 0.45 g of hydroquinone and 1 mole of trimethylolpropane, raised to 80°C. and 3 moles of hydroxyethyl acrylate added thereto. The temperature was again raised to 80°C. and 3 moles of acrylamide added. The temperature was then raised to 90°C and 6.39 moles of formaldehyde was added in the form of paraformaldehyde after which the whole whole was raised to reflux and water of reaction was removed by brisk reflux of toluene via the separator. As the temperature of the reaction mixture approached 140°C evolution of water ceased. Processing solvent was then removed by vacuum distillation at a batch temperature below 140°C. The product remaining in the flask was allowed to cool and was then filtered. The filtrate was a clear liquid of viscosity 0.3 stoke at 25°C.

b. The polyester of Example 9(b) was made into a dry offset metal decorating coating by milling 30 parts of rutile titanium dioxide and 6 parts of Aerosil R972 (Aerosil is a registered trade mark) into 25.6 parts of the polyester of example 9(b) and thinning with 29.3 parts of the filtrate of (a) above. 9 parts of Trigonal 14 and 0.2 parts of ditertiary butyl phenol were added.

This metal decorating coating was applied as a 2 micron film on electrolytic tinplate. The coating cured to a stackable film on exposure to U.V. radiation.

EXAMPLE 11 a. A polyester (polyester F) was prepared from the following ingredients:

| Maleic anhydride | 58.8 | parts |
| --- | --- | --- |
| Isophthalic acid | 49.8 | parts |
| Phthalic anhydride | 44.4 | parts |
| Trimethylol propane | 53.6 | parts |
| Cardura E | 147.0 | parts |
| 2,2-(di,4-hydroxy cyclo hexyl propane) | 72.0 | parts |

The reactants were heated in a stream of nitrogen at 225°C until the acid value of the mixture had fallen to 20 mg KOH/g.

b. Polyester F was used as component D in the preparation of a product of the invention using the following ingredients:

| Polyester F | 246 | parts |
| --- | --- | --- |
| Toluene | 35 | parts |
| Hydroquinone | 0.35 | parts |
| Hydroxy ethyl acrylate | 41 | parts |
| Acrylamide | 25 | parts |
| Paraformaldehyde | 25 | parts |

The procedure followed that of Example 1, with similar results.

EXAMPLE 12

A modified polyester of the invention was prepared using a hemiacetal technique from

| | | |
|---|---|---|
| Hydroxyethyl acrylate | 156 | parts by weight |
| Paraformaldehyde (82% HCHO)* | 102 | " |
| monomeric reactive solvent of Example 5b | 270 | " |
| Hydroquinone | 0.4 | " |
| toluene | 44 | " |
| polyester of Example 1 | 200 | " |
| acrylamide | 95 | " |
| toluene | 44 | " |

*Commercially known as 82 S prills (ex Synthite Ltd. of West Bromwich).

The hydroxyethyl acrylate, paraformaldehyde, monomeric reactive solvent of example 5b, the hydroquinone and the toluene were placed in a reaction flask fitted with a stirrer reflux condenser thermometer and stirrer and heated to gentle reflux (115°C). The reflux condenser was replaced by a Dean and Stark entrainment distillation unit. The temperature was raised to 125°C over a period of 15 minutes in which time 20 parts water had been removed and the reaction mixture had become a clear solution. The temperature was lowered to 90°C and the polyester of Example 1 was added. The temperature was returned to 90°C and the acrylamide and toluene added. The reaction mixture was heated to reflux (125°C). The water of reaction was removed by brisk reflux of the toluene via the separator. As the temperature of the reaction approached 145°C the evolution of water ceased. A total of 45 parts water was removed. The temperature was lowered to 130°C. The processing solvent was removed by vacuum distillation on the subsequent cool down. 87 parts of distillate were recovered.

An insulation covercoat was prepared from:

| | | |
|---|---|---|
| Permant pink FSRK | 0.5 | parts by weight |
| Modified polyester of this Example | 67.5 | " |
| Reactive monomer of Example 10a | 15.0 | " |
| Melamine formaldehyde resin | 5.0 | " |
| Trigonal 14 | 10.0 | " |
| Defoamer PC 1344 | 2.0 | " |

All the components were blended together and then passed over a triple roll mill to an Ault and Wiborg grind gauge reading of 0.5. The covercoat was screen printed over conventional phenolic paper laminate printed circuit board, and the film exposed to the radiation from high pressure mercury lamp (200 watts per linear inch) carried under the lamp on a conveyor at 200 ft/min. The coating cured to a hard film in 15 passes.

We claim:

1. A process for the preparation of a polymerizable composition which comprises reacting, in one or more stages and in the presence of a polymerzation inhibitor, (A) acrylamide or methacrylamide; (B) at least 1.5 moles of formaldehyde per mole of acrylamide or methacrylamide; (C) from 0.95 to 1 mole ($x$ mole), per mole of acrylamide or methacrylamide, of an organic hydroxyl group-containing component comprising one or more organic hydroxyl group-containing compounds containing one primary or secondary aliphatic hydroxyl group per molecule as sole chemical functional group; and (D) $k-x$ moles (wherein $k$ is the number of moles of formaldehyde used ignoring any excess over two) of one or more polyesters having primary and/or secondary hydroxyl groups alone or a mixture of said polyester or polyesters with one or more hydroxyl group-containing compounds containing from 1 to 4 primary or secondary hydroxyl groups per molecule.

2. A process as claimed in claim 1 in which at least one of the said hydroxyl group-containing compounds forming component (C) is unsaturated.

3. A polymerizable composition produced by the process of claim 1.

4. A composition as claimed in claim 3 in which said polyester has a hydroxyl equivalent of from 1120 to 280.

5. A composition as claimed in claim 4 in which said polyester has a hydroxyl equivalent of from 560 to 350.

* * * * *